MITCHELL W. PANEK
INVENTOR.

BY E T McCabe

ATTORNEY.

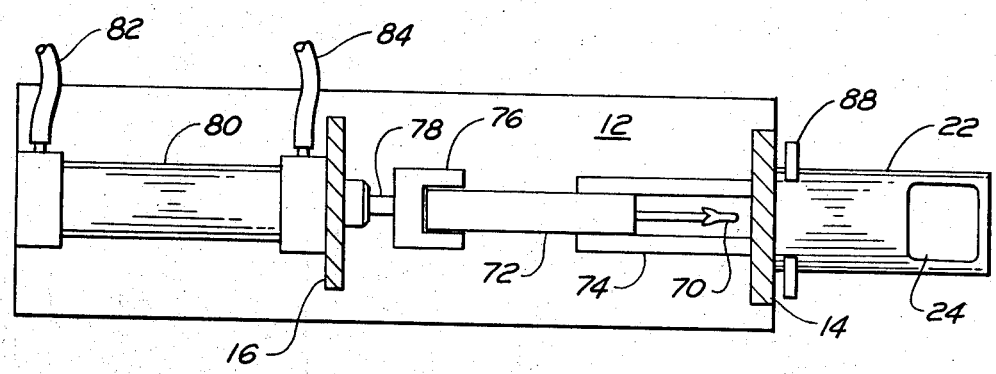
Fig_2
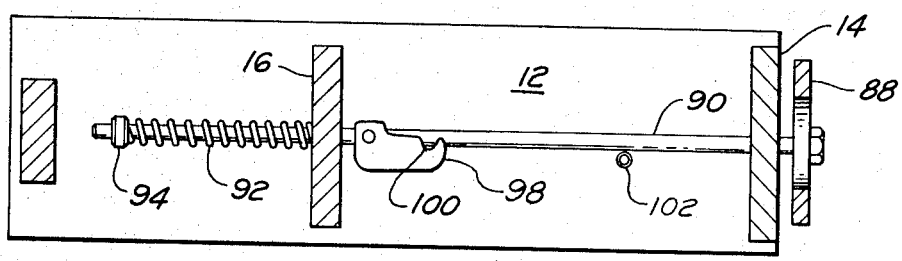
Fig_3

3,541,634
POULTRY HANDLING

Mitchell W. Panek, Chicago, Ill., assignor to Swift & Company, Chicago, Ill., a corporation of Delaware
Filed Sept. 8, 1967, Ser. No. 666,434
Int. Cl. A22c *21/00*
U.S. Cl. 17—46                                    5 Claims

ABSTRACT OF THE DISCLOSURE

The keel bone is removed from eviscerated fowl by supporting the latter preferably from the interior of the body cavity and applying a compressive force against the keel bone from outside the body and in an inward direction. Thereafter the keel bone is engaged within the cavity and pulled free through the posterior opening in the fowl carcass. An apparatus for performing the method includes a tubular support for insertion into the body cavity, and a punch member drivable against the exterior of the keel bone. An aperture in the tubular support allows the keel bone to be thus pushed partly into the support. Thence a claw that is reciprocable within the tubular support extracts the keel bone by withdrawing same through the rear thereof. An ejector ram is also actuated by the claw to propel a completed carcass from the support when the claw is returned to the forward end thereof.

---

This invention relates to an improved method and apparatus for processing small edible fowl. More specifically, the present invention is an improved method and apparatus for removing the keel bone from small fowl.

Modern poultry processing for the production of edible meat is conducted in plants that process thousands of birds each day. At such plants, the slaughtering, plucking, evisceration, cleaning, chilling, and packaging of fowls for shipment to retail stores is conducted quickly and efficiently.

Relatively small game-type birds have recently become popular with a significant portion of the poultry consuming public. A notable example of such birds are known as "Rock Cornish Hens" and are substantially smaller in size and weight than chickens. Because of the small size and weight of such birds, the processing costs assume a larger relative portion of the cost of production. Additionally, evisceration of such small birds is made difficult in that it is tedious for operations to handle and difficult for automatic equipment to be utilized.

Such small birds also have a pronounced keel bone in their skeletal structure. The keel bone is located centrally of the forward portion of the breast, visibly protruding beneath the flesh at that point, and causes the illusion of a bird with inadequate flesh. Ultimate packaging of the birds for shipment to retail stores is facilitated if the keel bone is removed as the carcass becomes more pliable and compact, and there is a lessened tearing or puncturing of film wrappers which can be caused by the bone. Also, consumers appear to prefer the appearance of product having the keel bone removed. Heretofore, the keel bone has been removed by hand at exceptional labor costs.

Because of the small size of the birds and the small size of the keel bone, hand removal is a relatively slow and dangerous process, and the operator may be cut by the bird structure. A processing line capable of handling 4800 birds per hour has required 10 operators to perform the keel bone removal step alone, whereas a skilled operator practicing the present invention may process 25 birds per minute.

Accordingly, it is an object of the present invention to provide an improved method and apparatus to remove the keel bone from poultry carcasses. It is another object of the present invention to provide an improved method and apparatus for semi-automatically removing the keel bone from small poultry carcasses.

Basically, the present invention involves the processing of eviscerated carcasses by supporting the carcass from within the body cavity and at an area surrounding the location of the keel bone. While thus supported, an inwardly directed compression is applied to the exterior of the carcass at the keel bone so as to break it from the skeletal frame and push it inwardly into the body cavity. Thereafter, the keel bone is engaged within the cavity and extracted therefrom through the posterior opening which was made when the bird was eviscerated.

An apparatus for performing the method of the invention includes a supporting means upon which the bird can be emplaced, and a compressing means adjacent the supporting means which is movable against the keel bone of a poultry carcass thus supported. The apparatus also preferably includes an extracting means engageable with the keel bone within the carcass body cavity and movable to withdraw same therefrom.

Further objects and advantages will become apparent upon reading the following detailed disclosure in conjunction with the drawings wherein:

FIG. 2 is a plan view in partial section of the apparatus taken at line 2—2 in FIG. 1; and FIG. 3 is a partial detailed plan view of a part of the apparatus taken at line 3—3 in FIG. 1.

Figure 1:
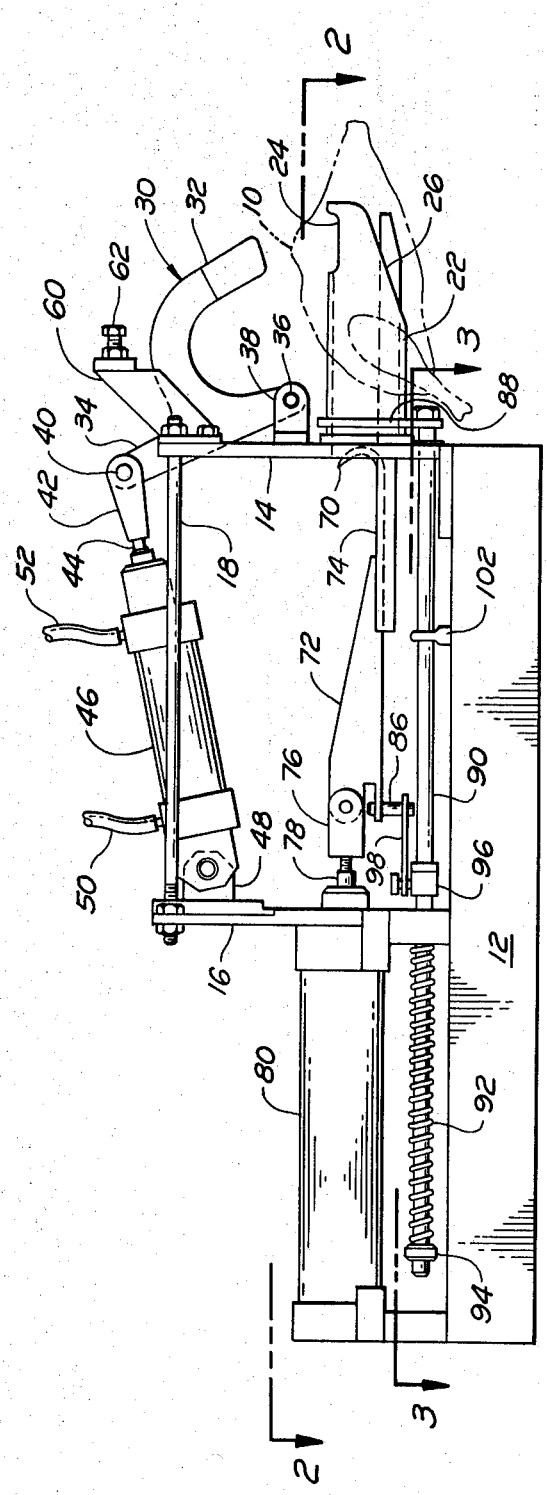
FIG. 1 is a side elevation view of an embodiment of the present apparatus.

When processing small fowl according to the present invention, the bird is first eviscerated so as to produce a posterior opening and a clean body cavity from which the organs have been removed. Such an eviscerated carcass is then emplaced upon a supporting sleeve, preferably of tubular shape and having an aperture at the forward end thereof. The poultry carcass is positioned so that the keel bone (designated by the reference character 10 in FIG. 1) is aligned with the aperture in the supporting sleeve, and a compressing force is then exerted against the exterior of the keel bone from a point opposite the aperture. Such compressive force is applied locally to the area of the keel bone and is continued until the latter is broken from the skeletal structure and forced inwardly at least partly into the body cavity of the bird. At this point, the keel bone is engaged and withdrawn from the interior of the bird so as to leave the exterior flesh and skin unbroken. Preferably, the keel bone is extracted from the body cavity by engaging same at the forward end (toward the neck) after it has been compressed partly into the cavity, and then pulling it rearwardly so as to further break and tear it from the body structure and thence remove it in a rearward direction through the posterior opening of the bird.

The carcass is then removed from the supporting means and further processed for packaging and shipment.

A preferred apparatus for performing the foregoing method is shown in FIGS. 1–3. This apparatus comprises a frame having a horizontal bed 12 and front and rear uprights 14, 16, respectively, rigidly connected at the upper extremities by spacer rods 18.

A tubular sleeve 22 extends forwardly of the front upright 14 and comprises the aforementioned supporting means. An aperture 24 is cut in the upper and forwardmost portion of the sleeve 22 and the lower portion thereof is cut on a diagonal to form a beveled end 26. The diameter of the sleeve and the angle of the beveled end are selected to facilitate insertion into the body cavity of small fowl through the usual posterior opening. When a fowl is placed thereon, as shown in fantom in FIG. 1, the keel bone will be directly above the aperture 24.

A punch member generally 30, comprising the compressing means, is pivotally mounted on the front upright 14 directly above the tubular sleeve 22. The punch is in the form of an arcuate stem 32 extending from a link 34 which is in turn pivotally mounted by pin 36 to a flange 38 which is secured to the upright 14.

An opposite end of the link 34 is pivotally mounted by a pin 40 to a clevis 42 mounted on the end of a piston rod 44 extending from a pneumatic cylinder 46. The cylinder in turn is pivotally mounted to a flange 48 which is fastened to the rear upright 16. Suitable air lines 50, 52 are connected between the cylinder 46 and conventional control valves and a source of air under pressure (not shown). When pressurized air is introduced to the rear of cylinder 46 through air line 50, the piston rod 44 will be moved forwardly, thus pivoting the punch generally 30 about pivot pin 36 and forcing the free end of the arcuate stem 32 toward the aperture 24 in the tubular sleeve 22. When a carcass is positioned on the latter, the stem 32 will be moved against the keel bone so as to break it from the carcass and push it at least partially through the aperture 24.

Reversal of air flow to direct same to the front end of cylinder 46 through air line 52 will draw the piston rod 44 rearwardly to reverse the movement of the punch generally 30. Movement of the latter may be limited in the forward direction by a backstop generally 60 having an adjustable nut 62 that will engage the link 34, and in the reverse direction limited by the clevis 42 reaching the end of the cylinder 46.

A means for extracting the keel bone from the area of the aperture 24 comprises a claw 70 which is secured to a follower 72 and is reciprocably slidable in a guideway 74 that extends through an opening in the front upright 14 and through the length of the tubular sleeve 22. The follower 72 is pivotally connected to a clevis 76 fastened to the end of a rod 78 of a second pneumatic cylinder 80. The latter cylinder 80 is also provided with air lines 82, 84 to provide forward and reverse movement of the claw 70. The claw as shown in FIG. 1 is fully withdrawn rearwardly of the tubular sleeve 22.

At this point, a keel bone extracted from a carcass would fall from the apparatus. When the claw 70 is moved to its forwardmost position, it extends just forwardly of the aperture 24 in the tubular sleeve 22. The claw 70 is extended to the forwardmost position before the punch generally 30 is pressed against a keel bone. Thereafter, as the punch 30 is withdrawn, and the keel bone extends at least partly beneath the aperture 24, the claw 70 is drawn rearwardly by introducing pressurized air through line 84 to the forward end of cylinder 80.

The preferred apparatus also includes a means to automatically remove or eject carcasses from the tubular sleeve 22 after processing is complete. To perform this function, a dog 86 is mounted on the underside of the rear portion of follower 72. The dog 86 is devised to propel an ejector ram 88 that is mounted forwardly of the front upright 14 to be reciprocable along the length of the tubular sleeve 22. Preferably the ejector ram is U shaped and is secured to an end of an actuating shaft 90 that is reciprocally mounted in openings in both front and rear uprights 14, 16. The actuating shaft extends rearwardly beyond the rear upright 16, and a compression spring 92 is mounted concentrically thereon between the latter and a terminal lock nut 94. A lug 96 is fixedly secured to the actuating shaft 90 just forward of the rear upright 16. Pivotally mounted on the upper surface of lug 96 is a cam 98 having a notch 100 that is engageable with the dog 86 on follower 72 when the latter is fully withdrawn. The cam is biased to align itself with the shaft 90 and engage the dog 86 in notch 100. When the claw 70 is moved forwardly by introducing pressurized air through line 82 to the rear end of cylinder 80, the dog 86 pulls, through cam 98, the actuating shaft 90 forwardly with it. This movement slides the ejector ram 88 forwardly so as to propel a carcass from the tubular sleeve 22. As the follower 72 reaches the forwardmost position where claw 70 is forward of aperture 24, the pivotal cam 98 engages a trip post 102 mounted vertically from the bed 12. As the cam 98 comes abreast of the trip post 102, it is engaged and pivoted thereby so as to disengage the dog 86 from notch 100 in the cam 98. At this point, the force of the compressed spring 92 will drive the actuating shaft rearwardly to return the ejector ram 88 to a position adjacent the forward upright 14. At the time that the claw 70 and follower 72 are withdrawn rearwardly, the dog 86 will again be engaged by the notch 100 in cam 98 for repetition of the foregoing cycle.

Each of the power drive cylinders 46 and 80 can be operated by conventional valves (not shown) either manually or automatically. Thereafter, well understood sequencing control means can control appropriate valves because the compressing means to be advanced and withdrawn and thence cause the extracting means to be withdrawn and then returned, the latter movement also causing ejection of the carcass.

Obviously many modifications and variations of the invention as hereinbefore set forth may be made without departing from the spirit and scope thereof and, therefore, only such limitations should be imposed as are indicated in the appended claims.

I claim:
1. An improved method for removing the keel bone from eviscerated fowl, said method comprising: supporting the fowl; applying inward compression to the keel bone at a point exterior thereof so as to drive said keel bone inwardly into the body cavity of said fowl; and extracting only said keel bone from within said fowl and body cavity by engaging and withdrawing same through a posterior opening therein so as to leave the exterior flesh and skin unbroken.

2. The method of claim 1 wherein the extracting step is followed by removing the supporting of said fowl.

3. The method of claim 1 wherein the fowl is supported at locations on the interior of the body cavity surrounding the keel bone and compression of the latter is extended to drive it at least partially beyond said locations.

4. The method of claim 3 wherein the extracting step is followed by removing the supporting of said fowl.

5. The method of claim 3 wherein the fowl is emplaced upon a supporting means extending into the body cavity through a posterior opening in the fowl, the keel bone is extracted through said means, and the fowl is finally ejected from said means.

References Cited

UNITED STATES PATENTS 3,104,418   9/1963   Segur _____ 17—11
3,130,445   4/1964   Segur _____ 17—45

OTHER REFERENCES

Everybody's Cookbook, Lord, N.Y. Harcort, Brace & Co., pp. 611, 612.

LUCIE H. LAUDENSLAGER, Primary Examiner

U.S. Cl. X.R.

17—1, 11; 99—107